No. 652,328. Patented June 26, 1900.
W. N. PARKES.
FRICTION DEVICE FOR CONTROLLING RATCHET WHEELS.
(Application filed Oct. 10, 1899.)
(No Model.)

WITNESSES
E. P. Hendrickson
E. S. Paulin

INVENTOR:
William N. Parkes

UNITED STATES PATENT OFFICE.

WILLIAM N. PARKES, OF NEW YORK, N. Y.

FRICTION DEVICE FOR CONTROLLING RATCHET-WHEELS.

SPECIFICATION forming part of Letters Patent No. 652,328, dated June 26, 1900.

Original application filed January 7, 1899, Serial No. 701,527. Divided and this application filed October 10, 1899. Serial No. 733,230. (No model.)

*To all whom it may concern:*

Be it known that I, WILLIAM N. PARKES, a citizen of the United States of America, residing at New York, borough of Brooklyn, in the county of Kings and State of New York, have invented certain new and useful Improvements in Retarding Devices for Ratchet Movements, of which the following is a specification.

On June 29, 1897, a patent was granted to me, No. 585,225, on means for controlling ratchet-wheels, consisting of a frictional retarding device combined with means for subjecting the same to a force acting in a direction opposite to the direction of the rotation of the ratchet-wheel. In this device the ratchet-wheel is clamped between two friction-shoes to which a coil-spring is attached so as to draw on the shoes in a direction opposite to the direction of rotation of the wheel.

On January 7, 1899, I filed an application for a patent on an ornamental-stitch sewing-machine, Serial No. 701,527, in which I illustrated and described, in addition to the ornamental-stitch mechanism, a particular form of friction device for controlling the movements of the ratchet-wheel. In reply to that application the Patent Office required a division between the ornamental-stitch-forming mechanism and the friction device.

The friction device in the above-referred-to ornamental-stitch machine is the subject of my present invention.

In my present device I apply the friction to one side of the wheel only, which leaves the other side free for use in attaching a cam thereto or for any other purpose for which it may be required.

Figure 1:
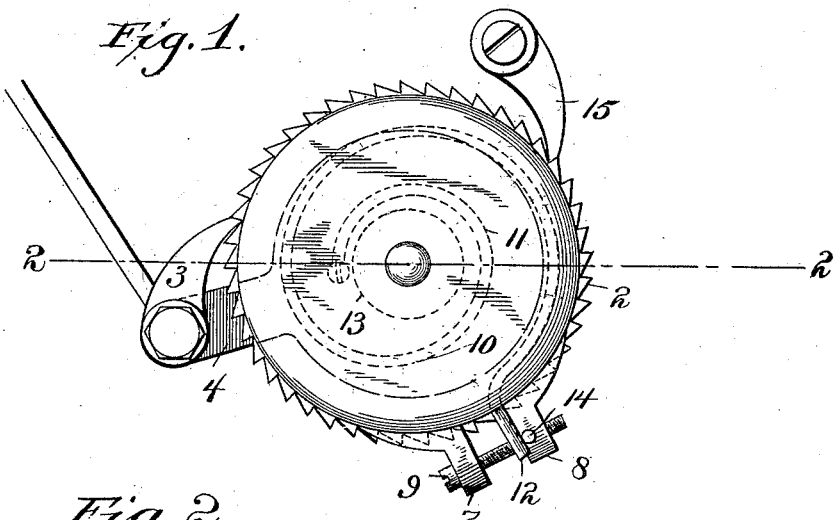
Figure 2:
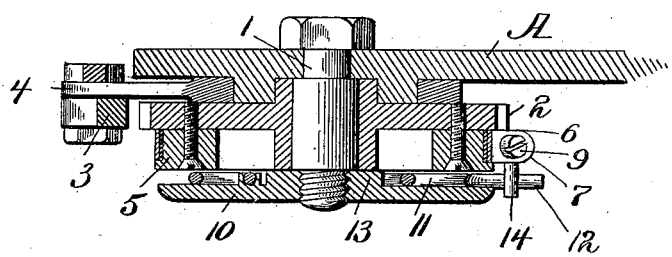
Figure 3:
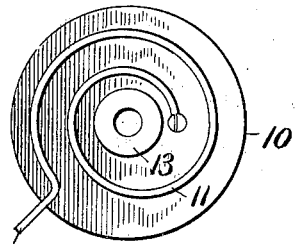

Referring to the drawings, Figure 1 is a face view of a ratchet-wheel with my improved friction device applied thereto. Fig. 2 is a sectional view on line 2 2, Fig. 1; and Fig. 3 is a detail showing the ratchet-wheel-retaining disk and the friction-strap-restraining spring.

Similar letters and numerals of reference designate corresponding parts throughout the several views of the drawings.

In the drawings, A designates a plate to which a stud 1 is attached. On the stud 1 is mounted a ratchet-wheel 2, which is operated in a usual manner by a pawl 3, carried by a pawl-lever 4, which latter can be operated in any usual manner. To the face of the ratchet-wheel is attached a bearing 5, adapted to carry a friction-strap 6, having extending ends 7 and 8. A screw 9 passes freely through the extension 7 and has a seat in extension 8. The stud 1 at its outer end is reduced and threaded, and a retaining-disk 10 is secured thereto. To the under side of the retaining-disk is attached one end of a spiral spring 11, which has extending end 12. A boss 13, formed on the under side of the retaining-disk 10, comes into contact with the shoulder on the stud 1 and loosely retains the ratchet-wheel on the stud 1, as shown in Fig. 2. The boss is of sufficient height to allow the spiral spring to move freely. A pin 14, which has a seat in the projection 8, is adapted to engage with the extending end 12 of the spring 11, and thereby hold the friction-strap against the forward movement of the ratchet-wheel. A stop-pawl 15 is adapted to prevent retrograde movement of the ratchet-wheel. The friction-strap 6 is preferably made of a flat steel spring, and leather is provided intermediate the spring and the bearing 5.

The operation of the device is as follows: Screw 9 is adjusted so that the strap produces the required amount of friction on the bearing 5 to control the movements of the ratchet-wheel. As the wheel moves forward the friction-strap is carried forward until the strain of the spring 11 is greater than the friction developed between the strap and the bearing 5, when the friction-strap is prevented from further forward movement.

This device prevents the ratchet-wheel from throwing ahead. The constant draw on the wheel in the opposite direction to its forward movement prevents the actuating-pawl from throwing the wheel ahead and at the same time draws the wheel back against the stop-pawl during each returning stroke of the actuating-pawl.

What I claim as new is—

1. A device for controlling the movements of ratchet-wheels in sewing-machines consisting of a bearing attached to the side of the ratchet-wheel, a friction-strap encircling the said bearing, a spiral spring, one end of the said spring in engagement with the said friction-strap and the other end attached to a stationary part of the machine.

2. A ratchet-wheel mounted on a stud, a retaining disk or nut for retaining the wheel on the stud, a friction device adapted to operate on the said ratchet-wheel, a spiral spring, one end of the said spring attached to the aforesaid disk and the other end adapted to engage a member of the friction device.

3. A ratchet-wheel mounted on a stud or bearing, a friction device mounted on the ratchet-wheel, a disk adapted to retain the ratchet-wheel on the stud, a spiral spring intermediate the disk and the ratchet-wheel, one end of the said spring attached to the disk and the other end adapted to engage the aforesaid friction device.

4. A ratchet-wheel mounted on a stud or bearing, a friction device, means adapting the said friction device to engage one side of the ratchet-wheel, a disk or nut adapted to retain the ratchet-wheel on the stud, yielding means intermediate the disk and the ratchet-wheel adapted to act on the friction device and draw on the same in an opposite direction to the rotation of the ratchet-wheel.

5. A ratchet-wheel suitably mounted, a friction device attached to the side of the said ratchet-wheel, a spiral spring, the axis of which is coincident with the axis of the ratchet-wheel, one end of the said spring attached to a stationary part of the machine and the other end to the aforesaid friction device.

In testimony whereof I have hereunto set my hand in the presence of two subscribing witnesses.

WILLIAM N. PARKES.

Witnesses:
EUGENIE P. HENDRICKSON,
GEO. W. EISENHAUR.